Figure 1:
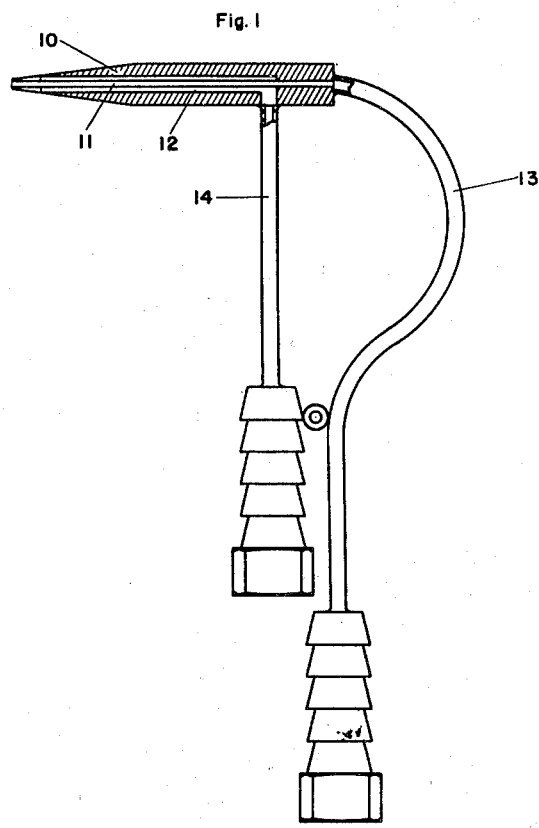

June 3, 1947. H. F. PRIEST ET AL 2,421,649
METHOD OF WELDING OR CUTTING METAL BY HYDROGEN-FLUORINE FLAME
Filed Feb. 13, 1943

INVENTOR.
Aristid V. Grosse
Homer Priest
BY

UNITED STATES PATENT OFFICE 2,421,649

METHOD OF WELDING OR CUTTING METAL BY HYDROGEN-FLUORINE FLAME

Homer F. Priest, New York, and Aristid V. Grosse, Bronxville, N. Y., assignors to the United States of America, as represented by the Director of the Office of Scientific Research and Development Application February 13, 1943, Serial No. 475,854

10 Claims. (Cl. 113—112)

This invention relates to a method of welding or cutting metal and more specifically to a method of welding or cutting copper.

In the past operators have found it almost impossible to weld copper and certain similar metals. Two reasons have been advanced for this difficulty. The first reason given is that a copper oxide is formed which prevents the weld from being properly formed. The second reason is that copper has such high thermal conductivity that heat flows away from the portion to be welded, before the weld can take place. This latter reason also makes it difficult to cut copper by means of a torch.

One object of the present invention is to provide a method of welding metal by means of the combustion of fluorine and hydrogen.

A second object is to provide a welding torch burning hydrogen and fluorine which will weld or cut copper.

Other objects of this invention will appear in the description to follow which description is illustrated by the drawing.

The single figure of drawings shows a partly sectioned side elevation of the welding torch.

The hydrogen and fluorine may be burned in several varieties of torch, but the concentric type has proved very satisfactory. As shown in the drawing the torch tip 10 is provided with an inner passage 11 and an outer passage 12. Fluorine is supplied to the inner passage 11 through pipe 13 which is conected by a flexible connection to a storage tank. Hydrogen is supplied to the outer passage 12 from pipe 14 which is likewise connected to a second storage tank.

Most metals decompose rapidly in the presence of fluorine. However, we have discovered (see co-pending application of Homer F. Priest and Aristid V. Grosse, Ser. No. 473,249, Apparatus for the storage of fluorine), that when copper is exposed to fluorine, a coating of copper fluoride is formed on the copper which retards further decomposition. Therefore, the hydrogen-fluorine torch may be made of copper, nickel, or copper alloys containing more than 60 percent copper. For example, one torch was made of copper with all joints soldered with a silver solder containing 60 percent copper.

The fluorine should be supplied to the torch at a greater pressure than the hydrogen, the preferred ratio of fluorine pressure to hydrogen pressure being greater than of 10 to 1, although the torch will weld if the ratio is less. One of the most satisfactory ratios was found to be a fluorine pressure of fifty pounds per square inch with a hydrogen pressure of two pounds per square inch.

The hydrogen-fluorine torch provides an intense flame that approximates a temperature of about 4000° C. so that sufficient heat is available at the welding point to weld, in spite of the high thermal conductivity of the material. At the welding point a shield of copper fluoride is formed over the weld, which acts as a flux to prevent oxidation of the molten copper. Therefore, no external flux need be used although certain fluxes may be used. Any flux used must be one that will remain molten until the welded copper hardens.

The hydrogen-fluorine torch may be used to weld other metals than copper. It is especially useful in welding metals with a high thermal conductivity, and those which oxidize readily. The torch may also be used for cutting copper and other metals. Its action is similar to that of the oxy-acetylene torch in cutting steel.

Obviously, many changes and refinements may be made in the method and apparatus shown and described without departing from the invention, and we desire the foregoing description to be considered as illustrative and not restrictive of the invention defined in the following claims.

We claim:

1. A method of welding metal comprising heating the metal to a welding temperature by the combustion of hydrogen and fluorine.

2. A method of welding copper comprising heating the copper to a welding temperature by the combustion of hydrogen and fluorine.

3. A method of welding or cutting metal comprising heating the metal by the combustion of fluorine under pressure and hydrogen under pressure, the ratio of the fluorine pressure to the hydrogen pressure being greater than 10 to 1.

4. A method of welding metal comprising heating the metal to a welding temperature by the combustion of hydrogen and fluorine in which the fluorine and metal form a metal fluoride coating during the welding.

5. A method of welding copper comprising heating the copper to a welding temperature by the combustion of hydrogen and fluorine in which the fluorine and copper form a copper fluoride coating during the welding.

6. A method of welding copper which comprises applying a flame of fluorine and hydrogen to the copper to form a molten fluoride coating over the weld and thereby prevent the oxidation of the copper at the area of the weld.

7. A method of welding or cutting copper comprising heating the copper with a flame formed by the combustion of hydrogen and fluorine.

8. A method of forming a weld in copper by applying a flame of fluorine and hydrogen to the point of weld to form a molten copper fluoride flux during the welding.

9. A method of welding highly thermal conductive metals by applying burning fluorine and hydrogen to the welding area, and thereby forming a protective fluoride flux so that the area of the weld remains in a molten state during the application of heat and until the joinder of metal is complete.

10. A method of welding or cutting metal comprising heating the metal with a flame formed by the combustion of hydrogen and fluorine under pressure, the pressure of the fluorine being greater than the pressure of the hydrogen.

HOMER F. PRIEST.
ARISTID V. GROSSE.

REFERENCES CITED

The following references are of record in the file of this patent:

UNITED STATES PATENTS

| Number | Name | Date |
|---|---|---|
| 2,092,033 | Stroup | Sept. 7, 1937 |
| 1,577,171 | Brownlee | Mar. 16, 1926 |
| 2,239,018 | Rogerson | Apr. 22, 1941 |
| 972,079 | Hoffmann | Oct. 4, 1910 |
| 1,325,116 | Sebille | Dec. 16, 1919 |
| 1,924,136 | Stern | Aug. 29, 1933 |
| 2,043,212 | Krauss | June 2, 1936 |
| 2,043,811 | Rooke | June 9, 1936 |
| 2,181,095 | Ness | Nov. 21, 1939 |

OTHER REFERENCES

Partington "Text Book of Inorganic Chemistry," pages 418–419, published 1926 by MacMillan and Co., London.